(12) United States Patent
Watanabe et al.

(10) Patent No.: US 9,010,974 B2
(45) Date of Patent: Apr. 21, 2015

(54) PROJECTOR TYPE VEHICLE HEADLAMP

(71) Applicant: Koito Manufacturing Co., Ltd., Minato-ku, Tokyo (JP)

(72) Inventors: Shigeyuki Watanabe, Shizuoka (JP); Tatsuhiko Yamamichi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 6 days.

(21) Appl. No.: 13/946,440

(22) Filed: Jul. 19, 2013

(65) Prior Publication Data

US 2014/0022807 A1  Jan. 23, 2014

(30) Foreign Application Priority Data

Jul. 23, 2012 (JP) ................... 2012-162435

(51) Int. Cl.
*F21V 17/02* (2006.01)
*F21V 29/02* (2006.01)
*B60Q 1/14* (2006.01)
*F21S 8/10* (2006.01)

(52) U.S. Cl.
CPC . *F21V 29/02* (2013.01); *B60Q 1/14* (2013.01); *F21S 48/1104* (2013.01); *F21S 48/1159* (2013.01); *F21S 48/1768* (2013.01); *F21S 48/325* (2013.01); *F21S 48/1216* (2013.01); *F21S 48/1305* (2013.01); *F21S 48/1778* (2013.01); *F21S 48/321* (2013.01)

(58) Field of Classification Search
USPC ......... 362/512, 459–460, 462, 463, 545–549, 362/257, 294
See application file for complete search history.

(56) References Cited

U.S. PATENT DOCUMENTS

2010/0253223 A1 * 10/2010 Inoue et al. .................. 315/82

FOREIGN PATENT DOCUMENTS

JP  2009-110895 A  5/2009

* cited by examiner

*Primary Examiner* — Joseph L Williams
(74) *Attorney, Agent, or Firm* — Sughrue Mion, PLLC

(57) ABSTRACT

A projector type vehicle headlamp includes a metal supporting member that has an upper surface to which a circuit board to which a light-emitting device is mounted is mounted; a projection lens; a reflector that reflects light of the light-emitting device toward the vicinity of a rearward focal point of the projection lens; a driving source provided in front of the metal supporting member; a movable shade configured to be arranged near the rearward focal point of the projection lens, or removed from near the rearward focal point, by the driving source; and a cooling fan that is provided below the metal supporting member, and that faces a lower surface of the metal supporting member.

8 Claims, 4 Drawing Sheets

PROJECTOR TYPE VEHICLE HEADLAMP

INCORPORATION BY REFERENCE

The disclosure of Japanese Patent Application No. 2012-162435 filed on Jul. 23, 2012 including the specification, drawings and abstract is incorporated herein by reference in its entirety.

BACKGROUND OF THE INVENTION

1. Field of the Invention

The invention relates to a projector type vehicle headlamp that includes a movable shade.

2. Description of Related Art

Japanese Patent Application Publication No. 2009-110895 (JP 2009-110895 A) describes a projector type vehicle headlamp configured such that a light distribution pattern is able to be changed by having a shade that forms a cutoff line be movable.

A driving source that drives the movable shade generates heat when driving the movable shade. In the projector type vehicle headlamp described in JP 2009-110895 A, no means for cooling the heated driving source is provided, so operation of the movable shade may be affected by heat trapped in the driving source.

SUMMARY OF THE INVENTION

The invention thus provides a projector type vehicle headlamp in which a driving source of a movable shade is able to be cooled.

A first aspect of the invention is a projector type vehicle headlamp including: a metal supporting member that has an upper surface to which a circuit board to which a light-emitting device is mounted is mounted; a projection lens; a reflector that reflects light of the light-emitting device toward the vicinity of a rearward focal point of the projection lens; a driving source provided in front of the metal supporting member; a movable shade configured to be arranged near the rearward focal point of the projection lens, or removed from near the rearward focal point, by the driving source; and a cooling fan that is provided below the metal supporting member, and faces a lower surface of the metal supporting member.

According to this projector type vehicle headlamp having this configuration, the driving source is cooled by being exposed to a convection of air moving toward the front or the rear, and the projector type vehicle headlamp is able to be made smaller.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
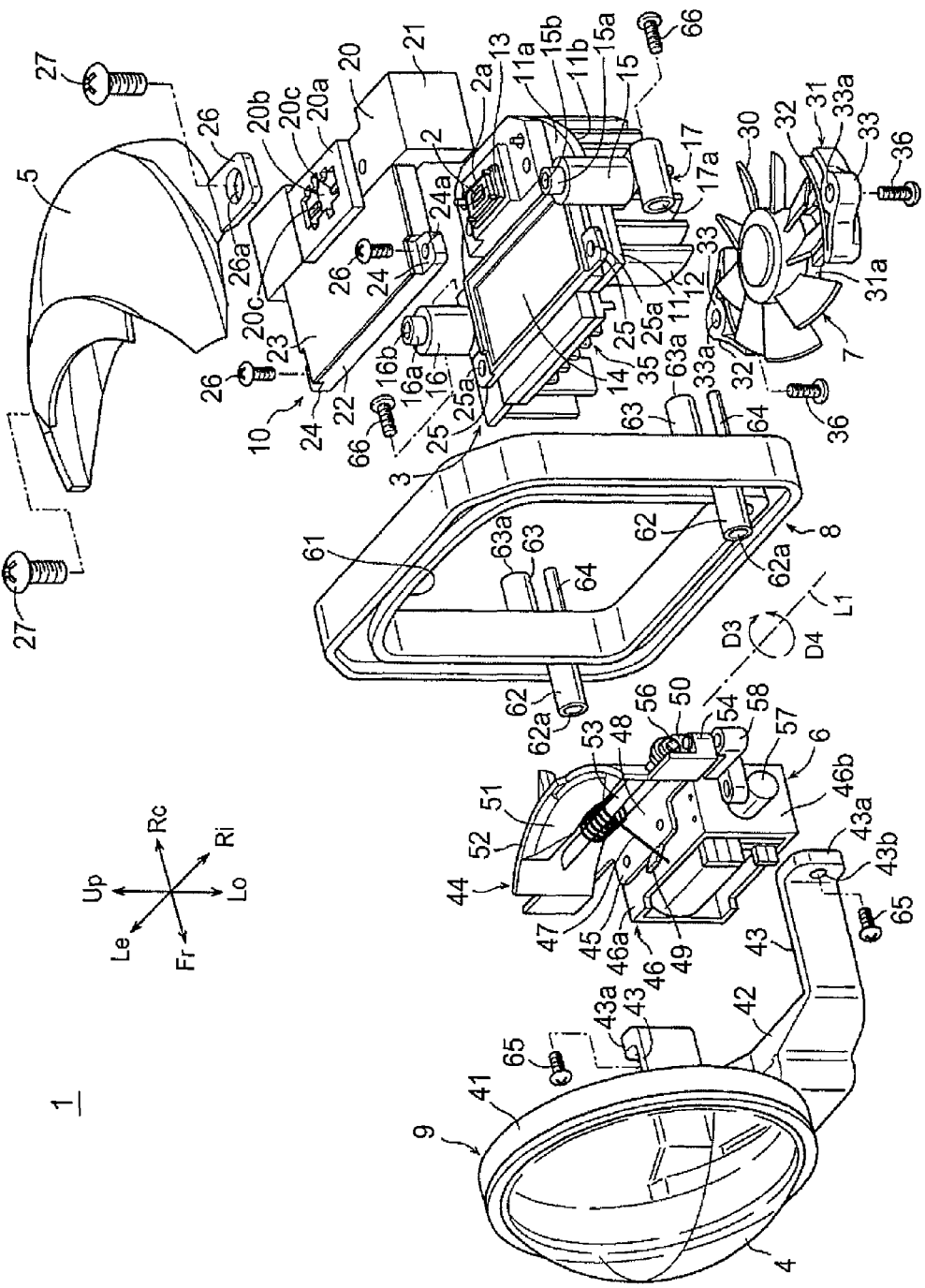
FIG. 1 is an exploded perspective view of a projector type vehicle headlamp according to an example embodiment of the invention.

A projector type vehicle headlamp 1 of an example embodiment of the invention will now be described with reference to FIGS. 1 to 4B. In FIGS. 1 to 4B, the direction in which a light-emitting device 2 is pointing is upward (the direction indicated by reference character "Up"), and the various directions (i.e., upward or upper, downward or lower, left, right, forward or toward the front, and rearward or toward the rear) with respect to the projector type vehicle headlamp 1 are denoted by reference characters "Up", "Lo", "Le", "Ri", "Fr", and "Re", respectively.

Figure 2:
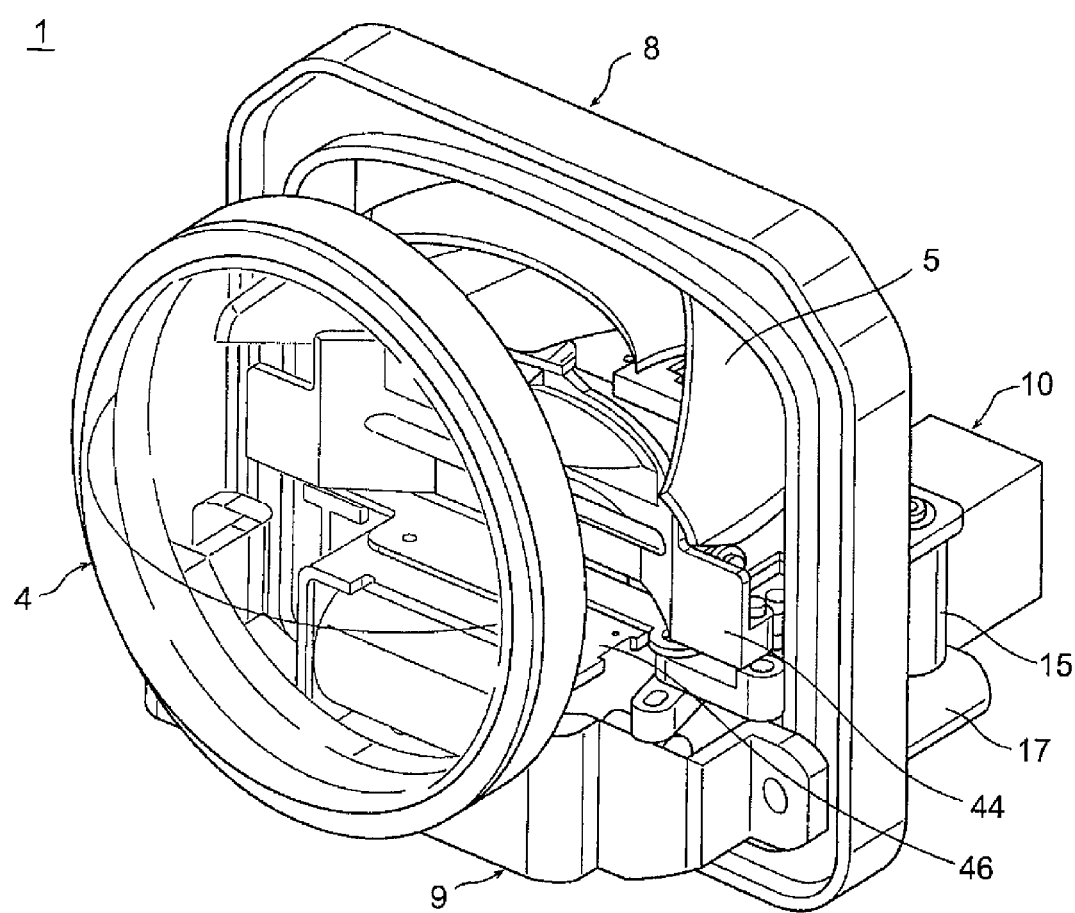
FIG. 2 is a perspective view of the projector type vehicle headlamp according to the example embodiment.
Figure 3:
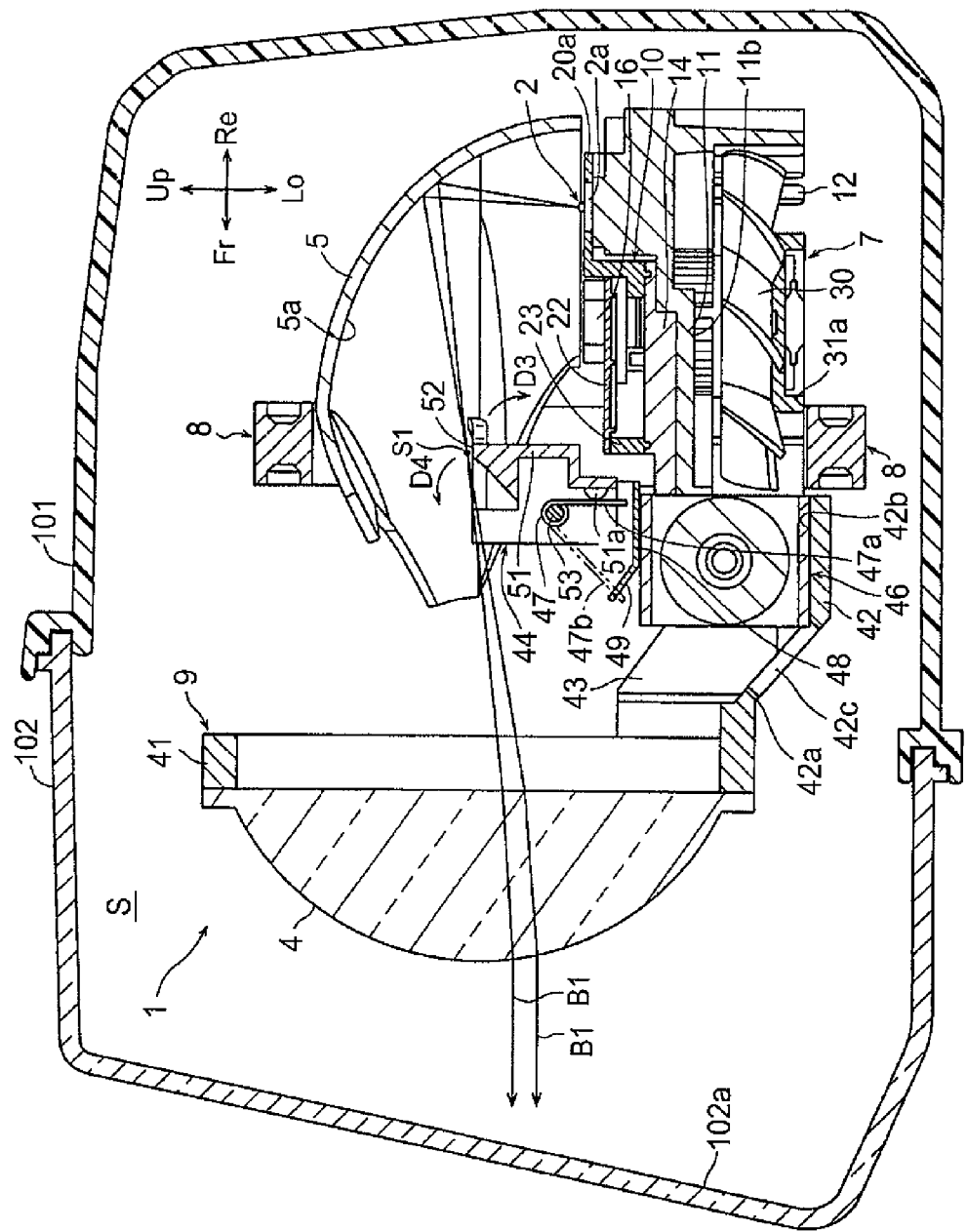
FIG. 3 is a longitudinal sectional view (a right side view of a cooling fan only), cut in an optical axis direction, of the projector type vehicle headlamp according to the example embodiment arranged inside of a lamp body and a front cover.

The projector type vehicle headlamp 1 in this example embodiment includes an LED (light-emitting device) 2 that is to be a light source mounted on a circuit board 2a, a metal supporting member 3, a projection lens 4, a reflector 5, a movable shade unit 6, a cooling fan unit 7, a bracket 8, a lens holder 9, and a power supply attachment 10, as shown in FIGS. 1 to 3. The projector type vehicle headlamp 1 is arranged in a lamp chamber S formed inside of a lamp body 101 that is made of resin or the like and is open in front, and a transparent or semitransparent front cover 102 that closes the front of the lamp body 101, as shown in FIG. 3. Also, the projector type vehicle headlamp 1 is supported in the lamp body 101 by an aiming mechanism (i.e., a tilting mechanism), not shown.

The metal supporting member 3 includes a semicircular (when viewed from above) top plate 11, and multiple radiation fins 12 provided protruding on a lower surface 11b of the top plate 11. A stepped LED mounting portion 13 is provided near a rear end portion of an upper surface 11a of the top plate 11. The LED mounting portion 13 is integrally formed with the top plate 11 so as to protrude from the upper surface 11a. The circuit board 2a of the LED 2 is mounted to the LED mounting portion 13. Heat generated by the LED 2 when it is illuminated is released outside of the LED 2 via the radiation fins 12 of the metal supporting member 3. Also, an attaching member 14 of the power supply attachment 10 is fixed in front of the LED mounting portion 13 of the upper surface 11a. Also, a pair of supports (15, 16) that extend vertically are integrally provided with the top plate 11, one on each of the left and right ends of the top plate 11. A pair of cylindrical portions (denoted by reference character 17; only one of which is shown) that extend longitudinally (in the front-rear direction) are provided below the supports (15, 16). These cylindrical portions 17 are integrally formed with some of the radiation fins 12.

The power supply attachment 10 includes a plate-shaped main body portion 20 that is made of resin or the like and extends in the left-right direction, a power supply connecter portion 21 that is formed extending downward from a right end portion of the main body portion 20 and is open in back (i.e., to the rear), and a mounting portion 22 that is formed extending out from a front end portion of the main body portion 20. An LED/driver module (hereinafter simply referred to as "LDM") 23 that functions as a lighting control circuit of the LED 2 is mounted to the mounting portion 22. Also, a stepped portion 20a is provided protruding upward in the center of the main body portion 20. A plurality of LED contact points 20c that protrude inward on an inner peripheral surface of a through-hole 20b that extends in the vertical direction through the stepped portion 20a are provided in the through-hole 20b. The contact points 20c, the LDM 23, and a terminal, not shown, of the power supply connecter portion 21 are all conductively connected together by a metal conductive pattern, not shown, inside the power supply attachment 10. A pair of tongue-shaped fixing portions 24, each having a hole 24a (only one is shown), are provided one on each of the left and right ends of the mounting portion 22. Also, a pair of tongue-shaped supporting portions 25, each having a female screw hole 25a in a position corresponding to the hole 24a of the corresponding fixing portion 24, are provided on the attaching member 14 that is fixed to the metal supporting member 3.

The power supply attachment 10 is fixed to the metal supporting member 3 by screwing two screws 26, having been inserted into the two holes 24a, into the screw holes 25a with the LED 2 arranged in the through-hole 20b. As a result, a power receiving terminal, not shown, that is electrically connected to the reflective portion 22a of the LED 2 contacts the contact points 20c, so the LED 2 is held in a conductive state to the conductive pattern, not shown, of the power supply attachment 10.

The reflector 5 that is made of resin or the like has a spheroidal plane shaped reflective surface 5a that is open in front, and a pair of tongue-shaped fixing portions 26 (only one of which is shown) provided one on each of the left and right sides of an outer peripheral surface. The reflective surface 5a is arranged on the inside of the reflector 5. Also, a through-hole 26a is provided in each of the fixing portions 26. Thin cylindrical portions (15a, 16a) each having a female screw hole (15b, 16b) are provided one on each upper end of the supports (15, 16) of the metal supporting member 3. The reflector 5 is fixed to the metal supporting member 3 by screwing a pair of screws 27 into the female screw holes (15b, 16b) of the thin cylindrical portions (15a, 16a) that are engaged with the pair of through-holes 26a. Emitted light B1 from the LED 2 is reflected by the reflective surface 5a so as to be focused in the vicinity of a rearward focal point S1 of the projection lens 4 that will be described later.

The cooling fan unit 7 includes a cooling fan 30, and a shaft support member 31 that rotatably supports the cooling fan 30 about a rotational axis. The cooling fan 30 is fixed to a rotating shaft of a motor, not shown, that is housed in a motor housing portion 31a of the shaft support member 31. The cooling fan 30 rotates in either a forward direction (direction D1 in FIG. 4A) or a reverse direction (direction D2 in FIG. 4B), depending on the conducting mode of the motor. A pair of arm portions 32 that extend out sideways from below the cooling fan 30 are provided one on each of the left and right sides of the motor housing portion 31a. Cylindrical portions 33, each having a hole 33a, are integrally formed with the arm portions 32, on the outside of the arm portions 32.

A housing portion 35 of the cooling fan unit 7 is provided on a lower portion of the metal supporting member 3. The housing portion 35 is defined by shortening the length, in the protruding direction, of some of the radiation fins 12 that face the cooling fan unit 7. A pair of cylindrical supports, not shown, are provided on the lower surface 11b of the top plate 11, in positions corresponding to the pair of cylindrical portions 33 of the cooling fan unit 7. Each of these supports has a female screw hole in it. The cooling fan unit 7 is fixed to the supports of the metal supporting member 3 in a state housed in the housing portion 35, by screwing a pair of screws 36, having been inserted through holes 33a in the cylindrical portions 33 from below, into the female screw holes of the supports. The fixed cooling fan 30 faces the lower surface 11b of the top plate 11 of the metal supporting member 3.

The projection lens 4 is fixed to the lens holder 9 that is made of resin or the like. The lens holder 9 has a unit attaching portion 42, and a pair of vertical wall-shaped arm portions 43 that extend rearward from left and right ends of the unit attaching portion 42. The unit attaching portion 42 is integrally formed with the pair of arm portions 43. The unit attaching portion 42 has a cylindrical lens attaching portion 41 that fixes the projection lens 4, an angled extending portion 42a that extends rearward at an angle from a lower end portion of the lens attaching portion 41, and a unit attaching surface 42b that extends horizontally to the rear of the angled extending portion 42a. A vent hole 42c that extends through in a direction orthogonal to the direction of tilt of the angled extending portion 42a, is provided in the angled extending portion 42a. A tip end of one of the two arm portions 43 is curved to the left, and a tip end of the other end portion 43 is curved right, so as to form tip end portions 43a. A through-hole 43b is formed in each tip end portion 43a (only one through-hole is shown), extending through the tip end portion 43a in the front-rear direction. The movable shade unit 6 is fixed to the unit attaching portion 42.

The movable shade unit 6 includes a movable shade 44 made of resin or the like, a bracket 45 made of metal or the like, a rotary solenoid 46 that functions as a driving source, and a torsion spring 47. The bracket 45 includes a bottom portion 48 that is fixed to an upper surface 46a of the rotary solenoid 46, a tongue-shaped hooked portion 49 that extends upwards at an angle from a front edge of the bottom portion 48, and a pair of vertical wall-shaped supporting portions 50 (only one of which is shown) that extend upward one from each of the left and right ends of the bottom portion 48.

The movable shade 44 includes an arc-shaped main body portion 51 that protrudes toward the rear when viewed from above, a cutoff line forming portion 52 that is formed on an upper end of the main body portion 51, and a round bar-shaped attaching portion 53 that is provided extending left and right inside the main body portion 51 and to which the torsion spring 47 is attached. Also, a pressure receiving portion 54 that has an L-shaped cross-section when viewed from the right side is provided protruding toward the right on the right end portion of the main body portion 51. A pair of cylindrical support shafts 56 (only one of which is shown) are provided to the rear of the pressure receiving portion 54, on an outer periphery of the main body portion 51. The pair of support shafts 56 protrude out in the left and right directions on the same axis. The movable shade 44 is tiltably supported about an axis L1 that extends horizontally left and right by the bracket 45, by the pair of support shafts 56 being rotatably supported by the pair of supporting portions 50. Also, the rotary solenoid 46 to which the bracket 45 is fixed is fixed to the unit attaching portion 42 of the lens holder 9.

The torsion spring 47 that is attached to the attaching portion 53 contacts a protruding end 51a of the main body portion 51 at one end, and is hooked onto the hooked portion 49 of the bracket 45 at the other end. As a result, the torsion spring 47 urges the movable shade 44 in a direction D4 counterclockwise about the axis L1 when viewed from the right side. The rotary solenoid 46 includes a pivot shaft 57 that protrudes toward the right from a right side surface 46b, and an arm 58 that is fixed to an outer peripheral upper end portion of the pivot shaft 57. When the rotary solenoid 46 is energized, the pivot shaft 57 pivots in the direction D4 counterclockwise about the axis L1 when viewed from the right side.

The arm 58 extends rearward toward the pressure receiving portion 54 from an outer periphery of the pivot shaft 57, and an upper surface of the arm 58 contacts the pressure receiving portion 54 of the movable shade 44 that receives the urging force in the direction D4 about the axis L1. On the other hand, when the rotary solenoid 46 is de-energized, a lower surface of the arm 58 contacts a stopper, not shown, provided protruding to the right from the right side surface 46b of the rotary solenoid 46. Therefore, when the rotary solenoid 46 is de-energized, the pivot shaft 57 is retained so as not to be able to pivot in a direction D3. In an initial position when the rotary solenoid 46 is de-energized (see reference character 44a in FIG. 4A), the cutoff line forming portion 52 of the movable shade 44 is arranged near the rearward focal point S1 of the projection lens 4, and creates a predetermined light distribution pattern (such as a low beam light distribution pattern) by blocking a portion of the reflected light from the reflector 5.

On the other hand, when the rotary solenoid 46 is energized, the pivot shaft 57 and the arm 58 pivot in the direction D4 counterclockwise about the axis L1 when viewed from the right, against the urging force of the torsion spring 47. At this time, the pressure receiving portion 54 that is arranged in front of the support shaft 56 is pushed up by the arm 58 and pivots in the direction D3 clockwise about the axis L1, such that the movable shade 44 is moved to a position outside of the illuminating range of the emitted light B1 of the reflector 5 (see reference character 44b in FIG. 4A). The emitted light B1 of the reflector 5 creates a light distribution pattern (such as a high beam light distribution pattern) in which the emitted light B1 is not blocked by the movable shade 44. Also, when power to the rotary solenoid 46 is turned off, the urging force of the torsion spring 47 causes the movable shade 44 to return to its initial position by rotating in the direction D4 about the axis L1 until the arm 58 that has rotated in the direction D3 about the axis L1 contacts the stopper, not shown.

Also; the metal supporting member 3 and the projection lens 4 are integrally assembled by the bracket 8 that is made of resin or the like. The bracket 8 is formed in a hollow shape having a through-hole 61. Around the through-hole 61, a pair of front support shafts 62 are provided protruding toward the front, and a pair of rear support shafts 63 are provided protruding toward the rear. The front support shafts 62 are provided in positions corresponding to the through-holes 43b of the pair of arm portions 43 of the lens holder 9, and the rear support shafts 63 are provided in positions corresponding to through-holes 17a (only one of which is shown) formed in the pair of cylindrical portions 17 of the metal supporting member 3. Female screw holes 62a and 63a are provided in the front support shafts 62 and the rear support shafts 63, respectively.

The bracket 8 is attached via a pair of fixing shafts 64 to an aiming mechanism (i.e., a tilting mechanism), not shown, provided in the lamp body 101. The pair of fixing shafts 64 are formed protruding toward the rear from below the rear support shafts 63.

The lens holder 9 to which the projection lens 4 and the movable shade unit 6 are attached is easily fixed from the front to the bracket 8 by inserting a pair of screws 65 into the through-holes 43b of the arm portions 43 from the front, and screwing them into the female screw holes 62a of the front support shafts 62. Meanwhile, the metal supporting member 3 to which the reflector 5, the cooling fan unit 7, and the power supply attachment 10 are fixed is easily fixed from the rear to the bracket 8 by inserting a pair of screws 66 though the through-holes 17a of the cylindrical portions 17 from the rear, and screwing them into female screw holes 63a of the rear support shafts 63. That is, the metal supporting member 3 is attached to the front side of the bracket 8, and the projection lens 9 is attached to the rear side of the bracket 8.

Accordingly, the projector type vehicle headlamp 1 of this example embodiment is able to be easily assembled to the aiming mechanism simply by attaching the projection lens 4 to the bracket 8 that is tiltably attached to the aiming mechanism, from the front, and attaching the metal supporting member 3 to which the LED 2 is mounted, from the rear. Also, the rotary solenoid 46 is arranged to the rear of the front cover 102.

Figure 4A:
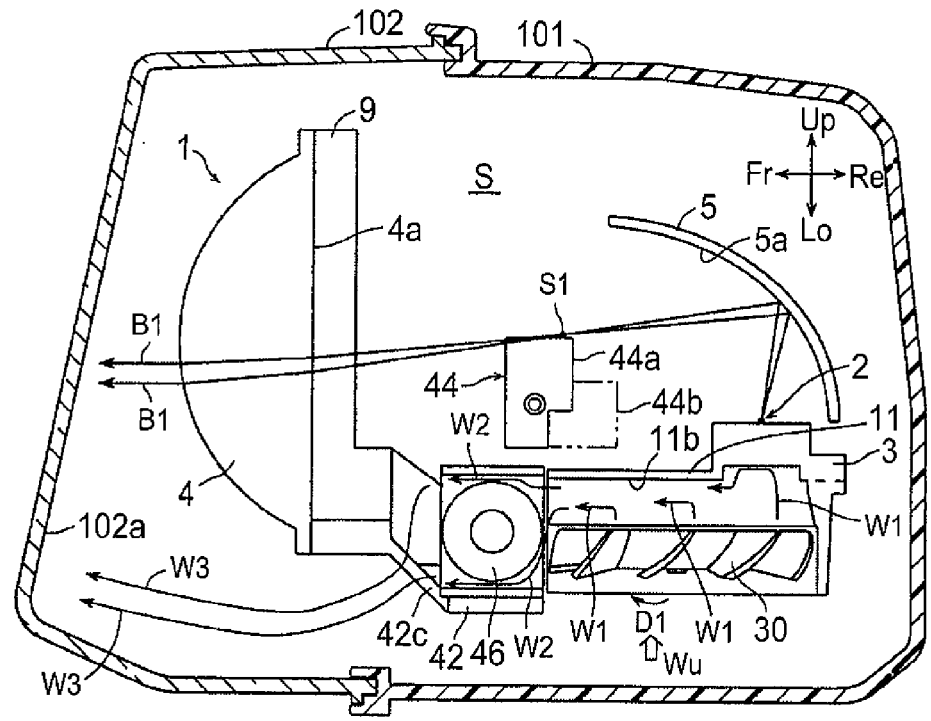
FIG. 4A is a view illustrating operation of a shade and a convection direction of air when the cooling fan is operated in a forward direction.

Next, cooling of the rotary solenoid 46 using the cooling fan 30 will be described with reference to FIGS. 4A and 4B. When the cooling fan 30 is rotated in direction D1 in FIG. 4A, the cooling fan 30 generates wind Wu in an upward direction (hereinafter simply referred to as "upward wind Wu"), such that a convection of air that is formed by winds W1 to W3 and moves toward the front is generated around the rotary solenoid 46. More specifically, after the upward wind Wu from the cooling fan 30 flows around the radiation fins 12 (not shown in FIG. 4), it contacts the lower surface 11b of the top plate 11 and changes direction and flows toward the front (wind W1) (hereinafter simply referred to as "forward wind W1"). This forward wind W1 flows above and below the rotary solenoid 46 that is arranged in front of the lower surface 11b (wind W2). The wind W2 that flows past the rotary solenoid 46 flows at an angle downward through the vent hole 42c of the unit attaching portion 42 and contacts an inside surface 102a of the front cover 102 (wind W3).

Heat generated in the rotary solenoid 46 when the rotary solenoid 46 operates is carried by the convection of air from the wind W2 and flows forward. As a result, heat is not trapped, so the rotary solenoid 46 is cooled. Also, the front cover 102 is heated by the wind W3 that is heated by the heat of the radiation fins 12 and the rotary solenoid 46 striking the inside surface 102a. As a result, with the projector type vehicle headlamp 1 of this example embodiment, the front cover 102 will not freeze even when the projector type vehicle headlamp 1 is used in low temperatures.

Figure 4B:
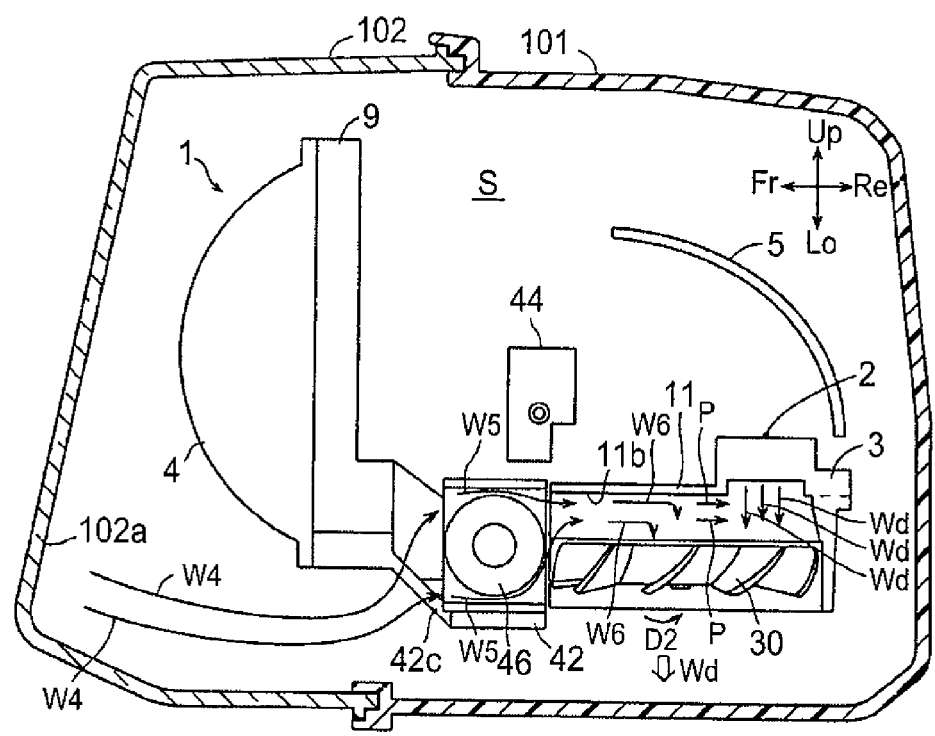
FIG. 4B is a view of the convection direction of air when the cooling fan is operated in a reverse direction.

On the other hand, when the cooling fan 30 is rotated in the direction D2 shown in FIG. 4B, a downward wind Wd is generated. The downward wind Wd generated below the top plate 11 of the metal supporting member 3 creates negative pressure P in a region below the top plate 11 of the metal supporting member 3. A convection of air that is formed by winds W4 to W6 and moves toward the rear is generated by this negative pressure P around the rotary solenoid 46.

More specifically, when the negative pressure P is created, a wind W4 that flows rearward toward the rotary solenoid 46 is generated near the inside surface 102a of the front cover 102. This wind W4 that flows toward the rear from the front cover 102 flows through the vent hole 42c of the unit attaching portion 42 at an angle upward, and then flows above and below the rotary solenoid 46 (wind W5). The wind W5 that flows past the rotary solenoid 46 enters between the cooling fan 30 and the lower surface 11b of the top plate 11 of the metal supporting member 3 that are arranged behind (i.e., to the rear of) the rotary solenoid 46, and then flows rearward along the lower surface 11b, and downward toward the cooling fan 30 (wind. W6). Heat generated in the rotary solenoid 46 when the rotary solenoid 46 operates is carried by the convection of air from the wind W5 and flows rearward, so the rotary solenoid 46 is cooled. The wind W6 that flows from the rotary solenoid 46 to the metal supporting member 3 cools the radiation fins 12 that have been heated by the LED 2, and is then discharged below the cooling fan 30. The wind W4 generated near the inside surface 102a of the front cover 102 is cooled by the front cover 102 when the front cover 102 is used in low temperatures. As a result, the rotary solenoid 46 and the radiation fins 12 are easily further cooled by the winds W5 and W6 generated by the cooled wind W4.

The multiple radiation fins 12 that are formed protruding on the lower surface 11b of the top plate 11 of the metal supporting member 3 are preferably formed in a vertical wall shape extending in the front-rear direction. The wind that flows along the lower surface 11b of the top plate 11 is led only forward or rearward by the vertical wall-shaped radiation fins 12 that extend in the front-rear direction, so the convection of air generated around the rotary solenoid 46 is intensified. Also, the area below the rear end portion of the lower surface 11b is preferably blocked off by forming vertical wall-shaped radiation fins that extend in the left-right direction, near the rear end portion of the lower surface 11b of the top plate 11. The vertical wall-shaped radiation fins that extend in the left-right direction near the rear end portion of the lower surface 11b inhibit a flow of air toward the rear of the metal supporting member 3 from being generated, so the region where a convection of air is generated is limited to an area that extends from a region below the cooling fan 30 to a region behind the projection lens 4. As a result, the convection of air generated around the rotary solenoid 46 is able to be intensified.

As described above, a projector type vehicle headlamp according to an aspect of the invention includes a metal supporting member that has an upper surface to which a circuit board to which a light-emitting device is mounted is mounted; a projection lens; a reflector that reflects light of the light-emitting device toward the vicinity of a rearward focal point of the projection lens; a driving source provided in front of the metal supporting member; a movable shade that is configured to be arranged near the rearward focal point of the projection lens, or removed from near the rearward focal point, by the driving source; and a cooling fan that is provided below the metal supporting member, and that faces a lower surface of the metal supporting member.

The cooling fan that is arranged facing the lower surface of the metal supporting member generates wind that moves upward or downward with respect to the lower surface of the metal supporting member, depending on the direction in which the cooling fan is rotating.

When the cooling fan generates upward wind, this upward wind strikes the lower surface of the metal supporting member and changes into a wind in the planar direction. As a result, a convection of air that moves toward the driving source of the movable shade, which is arranged in front of the metal supporting member, is created. This driving source is cooled by being arranged in the convection of air that moves toward the front.

On the other hand, when the cooling fan generates downward wind, this downward wind creates negative pressure near the lower surface of the metal supporting member. This negative pressure creates a convection of air around the driving source, which moves toward the rear along the lower surface of the metal supporting member. As a result, the driving source is cooled by being arranged in the convection of air that moves toward the rear. Also, the driving source that is arranged in the convection of air is housed in a space formed by the projection lens and the metal supporting member, so the projector type vehicle headlamp is able to be made smaller.

Thus, according to the projector type vehicle headlamp having this configuration, the driving source is able to be cooled by being exposed to a convection of air that moves forward or rearward, and the projector type vehicle headlamp is able to be made smaller.

The projector type vehicle headlamp having the configuration described above may be supported by a lamp body that is open in front, in a lamp chamber formed inside the lamp body and a transparent or semitransparent front cover that closes the front of the lamp body.

With the projector type vehicle headlamp having this structure, the driving source is supported behind the front cover, in the lamp chamber formed by the lamp body and the front cover. According to this structure, when the cooling fan generates upward wind, heat from the metal supporting member and the driving source is carried to the front cover by the convection of air that moves toward the front, so the front cover is inhibited from freezing when the projector type vehicle headlamp is used in low temperatures such as in winter.

On the other hand, when the cooling fan generates downward wind, cool air near the front cover is carried to the driving source by the convection of air that moves toward the rear due to the negative pressure, so the driving source is further cooled.

Thus, according to the projector type vehicle headlamp having this configuration, the driving source is able to be further cooled, or freezing of the front cover is able to be inhibited.

The projector type vehicle headlamp having the configuration described above may further include a bracket to which the metal supporting member is attached from behind and to which the projection lens is attached from in front may be provided.

With the projector type vehicle headlamp having this configuration, the metal supporting member to which the light-emitting device is mounted is attached to the front side of the bracket, and the projection lens is attached to the rear side of the bracket.

According to this configuration, the projector type vehicle headlamp is able to be easily assembled to, for example, a tilting mechanism such as an aiming mechanism, simply by attaching the projection lens to a tilting bracket, which is provided on the tilting mechanism for example, from the front, and attaching the metal supporting member to which the light-emitting device is mounted to the tilting bracket, from the rear.

The projector type vehicle headlamp having the configuration described above may further include a plurality of radiation fins provided protruding on the lower surface of the metal supporting member. The plurality of radiation fins may include a first radiation fin that is formed in a vertical wall shape extending in a front-rear direction. Also, the plurality of radiation fins may include a second radiation fin that is provided protruding near a rear end portion of the lower surface of the metal supporting member, and that is formed in a vertical wall shape extending in a left-right direction.

In the projector type vehicle headlamp having the configuration described above, the movable shade may be configured to create a first light distribution pattern in which a portion of the light of the light-emitting device reflected by the reflector, when the movable shade is arranged near the rearward focal point of the projection lens by the movable shade, and to create a second light distribution pattern in which the light of the light-emitting device reflected by the reflector is not blocked by the movable shade, when the movable shade is removed from near the rearward focal point of the projection lens.

What is claimed is:
1. A projector type vehicle headlamp comprising:
   a metal supporting member that has an upper surface to which a circuit board, to which a light-emitting device is mounted, is mounted;
   a projection lens;

a reflector that reflects light of the light-emitting device toward the vicinity of a rearward focal point of the projection lens;

a driving source provided in front of the metal supporting member;

a movable shade configured to be arranged near the rearward focal point of the projection lens, or removed from near the rearward focal point, by the driving source; and a cooling fan that is provided below the metal supporting member, and that faces a lower surface of the metal supporting member, wherein the driving source is arranged in a convection of air generated by the cooling fan.

2. The projector type vehicle headlamp according to claim 1, wherein the projector type vehicle headlamp is supported by a lamp body that is open in front, in a lamp chamber formed inside the lamp body and a transparent or semitransparent front cover that closes the front the lamp body.

3. The projector type vehicle headlamp according to claim 1, further comprising a bracket to which the metal supporting member is attached from behind, and to which the projection lens is attached from in front.

4. The projector type vehicle headlamp according to claim 1, further comprising a plurality of radiation fins provided protruding on the lower surface of the metal supporting member, wherein the plurality of radiation fins include a first radiation fin that is formed in a vertical wall shape extending in a front-rear direction.

5. The projector type vehicle headlamp according to claim 4, wherein the plurality of radiation fins include a second radiation fin that is provided protruding near a rear end portion of the lower surface of the metal supporting member, and that is formed in a vertical wall shape extending in a left-right direction.

6. The projector type vehicle headlamp according to claim 1, wherein the movable shade is configured to create a first light distribution pattern in which a portion of the light of the light-emitting device reflected by the reflector is blocked by the movable shade, when the movable shade is arranged near the rearward focal point of the projection lens, and to create a second light distribution pattern in which the light of the light-emitting device reflected by the reflector is not blocked by the movable shade, when the movable shade is removed from near the rearward focal point of the projection lens.

7. A projector type vehicle headlamp comprising:

a metal supporting member that has an upper surface to which a circuit board to which a light-emitting device is mounted is mounted;

a projection lens;

a reflector that reflects light of the light-emitting device toward the vicinity of a rearward focal point of the projection lens;

a driving source provided in front of the metal supporting member;

a movable shade configured to be arranged near the rearward focal point of the projection lens, or removed from near the rearward focal point, by the driving source;

a cooling fan that is provided below the metal supporting member, and that faces a lower surface of the metal supporting member; and a lens holder attached to a front side of a bracket, wherein the metal supporting member is fixed to a rear side of the bracket, and wherein the driving source is fixed to a rear portion of the lens holder.

8. The projector type vehicle headlamp according to claim 7, wherein the lens holder comprises:

a unit attaching portion having a cylindrical lens attaching portion configured to fix the projection lens;

an angled extending portion that extends rearward at an angle from a lower end portion of the lens attaching portion; and a unit attaching surface that extends horizontally to the rear of the angled extending portion, wherein the driving source is fixed on the unit attaching surface.

* * * * *